Patented Sept. 18, 1923.

1,468,366

UNITED STATES PATENT OFFICE.

ALBERT ANDREW KELLY, OF LONDON, ENGLAND.

PROCESS FOR THE PREPARATION OF SODIUM DECABORATE OR THE LIKE DIRECT FROM BORON ORES.

No Drawing.   Application filed September 16, 1920.   Serial No. 410,785.

*To all whom it may concern:*

Be it known that I, ALBERT ANDREW KELLY, a subject of the King of Great Britain, residing in London, England, have invented certain new and useful Improvements in a Process for the Preparation of Sodium Decaborate or the like Direct from Boron Ores, of which the following is a specification.

This invention relates to the preparation of sodium decaborate or the like direct from boron ores.

According to this invention sodium decaborate is produced directly from the ore by treating same either in a raw or calcined state with carbon dioxide, the treatment of the ore being conducted either at atmospheric or a higher pressure according to whether the carbon dioxide is in a dilute form or is pure.

As an example of the practical application of the invention boronatrocalcite is mixed with water in sufficient quantity to form a mixture of suitable consistency. The mixture is then heated and subjected to the action of carbon dioxide the gas being passed into the said mixture until the reaction is complete, any suitable pressure or temperature being employed.

After the reaction is complete the excess of carbon dioxide is boiled off and the insoluble matter remaining (consisting principally of calcium carbonate) is filtered off and the sodium decaborate crystallized from the filtrate in any known manner.

Should the amount of alkali (soda) existing in the mineral to be treated be insufficient to convert the whole of the boric acid present into sodium decaborate the necessary amount, in the form of caustic soda or sodium carbonate, should be added to the mixture before the treatment with carbon dioxide.

As a further example of the practical application of the invention sodium decaborate or potassium decaborate or other alkali-metal decaborate may be produced by taking any suitable boron ore either raw or calcined which either contains no alkali base existing either as free alkali or in combination with boric acid, or an insufficient quantity and adding a sufficiency of the alkali to form the required alkali-metal decaborate and then subjecting same mixed with water to the action of carbon dioxide in the manner before stated. For example in treating colemanite according to this invention the calculated amount of soda either as caustic soda or sodium carbonate may be mixed with powdered colemanite and water and the mixture treated with carbon dioxide at any suitable temperature and pressure until the reaction is complete. The excess of the carbon dioxide is then boiled off and the sodium decaborate separated by filtration and crystallization from the solution in any known manner.

As an example the following details of a suitable method are given.

120 pounds of a boron ore (that known as ulexite) was mixed with 200 pounds of water, a sufficient quantity of sodium carbonate being added to make up the natural deficiency of soda in the ore to form sodium decaborate.

This charge was then heated for 15 hours with constant agitation in an autoclave at a temperature of 100° C. The mixture was carbonated at a constant pressure of 50 pounds per square inch with carbon dioxide until saturated. The pressure was then released and the charge filtered. The liquor was then evaporated to a specific gravity of 1.25 and the sodium decaborate allowed to crystallize out.

It is obvious that an analysis of the ore is necessary to determine the amount of soda required to be added.

With the process conducted as above described 97.6% of the $B_2O_3$ content of the ore was converted into sodium decaborate.

The above illustration, as already stated, is given by way of example only and various changes may be made therein as may be found necessary or desirable.

The formula for sodium decaborate may be expressed as follows:

$$Na_2B_{10}O_{16}.10H_2O$$

The formula of anhydrous sodium decaborate may be expressed as follows:

$$Na_2B_{10}O_{16}$$

or $$Na_2O.5B_2O_3$$

The constitution of anhydrous sodium decaborate may be expressed by the following formula:

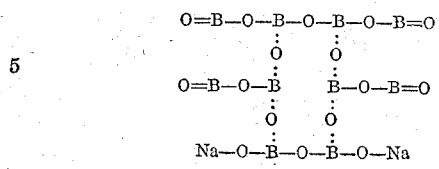

I claim:

1. The process herein described for the manufacture of alkali metal decaborate from boron ores according to which any necessary adjustment of the alkali metal content is made to produce the desired decaborate, the ore is then mixed with water, heated and subjected to the action of carbon dioxide the excess of carbon dioxide is then boiled off, the insoluble matter remaining is filtered off, and the decaborate recovered in the known manner from the filtrate.

2. The process herein described for the manufacture of alkali metal decaborate according to which colemanite after the necessary addition of the alkali metal content has been effected by the addition of sodium carbonate is mixed with water, heated, and subjected to the action of carbon dioxide, the excess of carbon dioxide boiled off, the insoluble matter remaining filtered and the decaborate recovered from the filtrate.

3. The process herein described for the manufacture of alkali metal decaborate according to which colemanite in a calcined state after the necessary addition of alkali metal is effected by the addition of sodium carbonate, is mixed with water, heated and subjected to the action of carbon dioxide, the excess of carbon dioxide boiled off, the insoluble matter remaining filtered and the decaborate recovered from the filtrate.

4. The process herein described for the manufacture of alkali metal decaborate from boron ores, said process comprising making the necessary adjustment of the alkali metal content, mixing the ore with water, heating and subjecting the mixture to the action of carbon dioxide, boiling off the excess of carbon dioxide, filtering off the remaining insoluble matter and recovering the decaborate from the filtrate.

5. The process herein described for the manufacture of alkali metal decaborate from boron ores, according to which the ore after any necessary adjustment of the alkali metal content is made to produce the desired decaborate is mixed with water, heated and subjected to the action of carbon dioxide under pressure, the excess of carbon dioxide is then boiled off, the insoluble matter remaining is filtered off and the decaborate recovered in the known manner from the filtrate.

6. The process herein described for the manufacture of alkali metal decaborate from boron ore according to which the ore in a raw condition, after any necessary adjustment of the alkali metal content is made to produce the desired decaborate is mixed with water, heated and subjected to the action of carbon dioxide under pressure, the excess of carbon dioxide is then boiled off, the insoluble matter remaining filtered off and the decaborate recovered in the known manner from the filtrate.

7. The process herein described for the manufacture of alkali metal decaborate from boron ores according to which the ore is first calcined, any necessary adjustment of the alkali metal content is made to produce the desired decaborate, the material is mixed with water, heated and subjected to the action of carbon dioxide under pressure, the excess of carbon dioxide is then boiled off, the insoluble matter remaining filtered off and the decaborate recovered in the known manner from the filtrate.

8. The process herein described for the manufacture of alkali metal decaborate according to which colemanite, after the necessary addition of alkali metal has been effected by the addition of sodium carbonate, is mixed with water, heated and subjected to the action of carbon dioxide under pressure, the excess of carbon dioxide boiled off, the insoluble matter remaining filtered and the decaborate recovered from the filtrate.

9. A process comprising treating with carbon dioxide under pressure a mixture of boron ore and water, heating and recovering the decaborate therefrom.

10. The process herein described for the manufacture of alkali metal decaborate from boron ores, said process comprising making any necessary adjustment of the alkali metal content, mixing the ore with water, heating and subjecting the mixture to the action of carbon dioxide under pressure, boiling off the excess of carbon dioxide, filtering off the remaining insoluble matter and recovering the decaborate from the filtrate.

In testimony whereof I affix my signature in the presence of two witnesses.

ALBERT ANDREW KELLY.

Witnesses:
S. TIFFIN,
H. E. GOUGH.